March 7, 1939. W. R. KUZELKA 2,149,298
LIQUID FEEDING SYSTEM FOR AIRPLANES AND THE LIKE
Filed Nov. 11, 1936
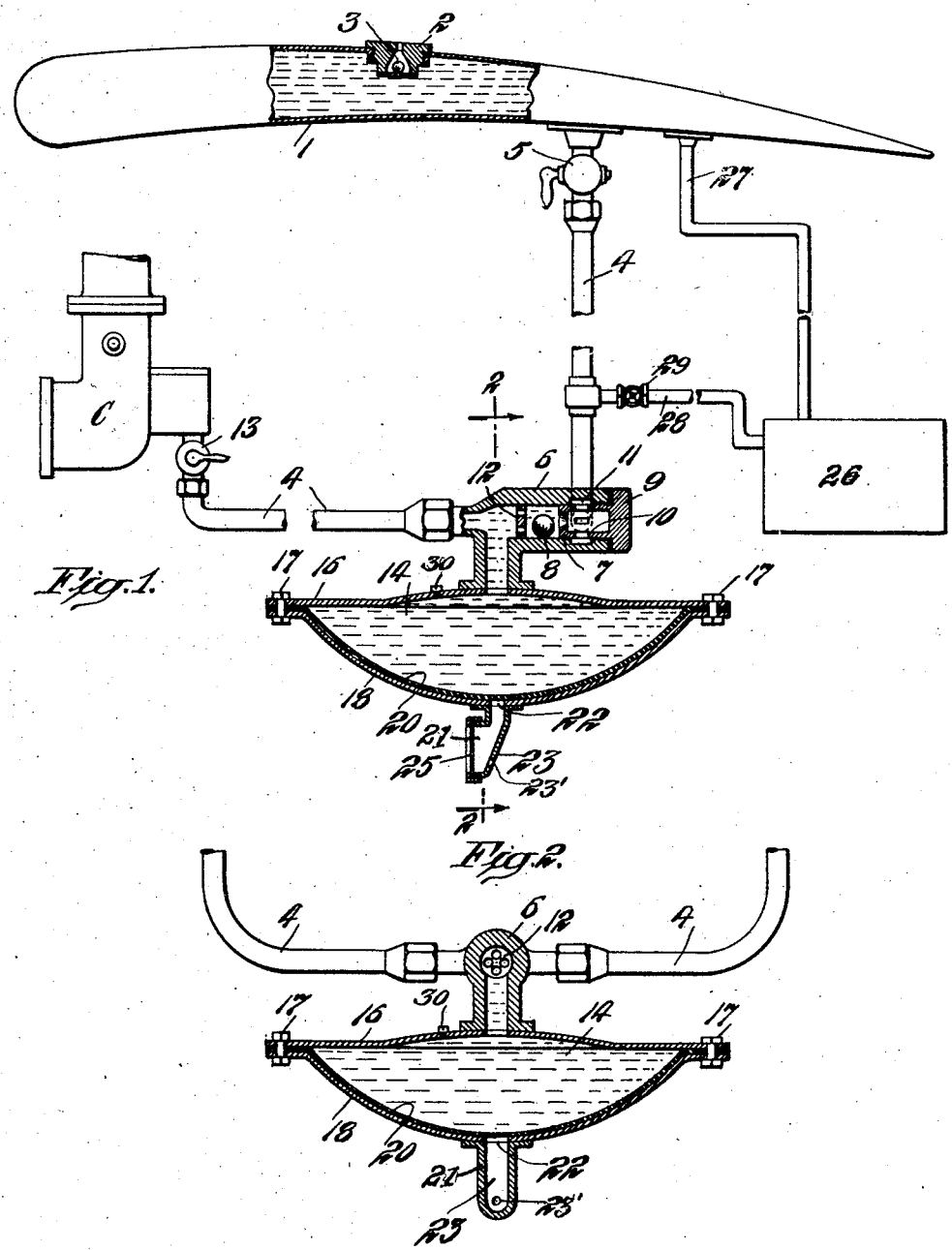
INVENTOR
WILLIAM R. KUZELKA
BY
ATTORNEY Patented Mar. 7, 1939

2,149,298

UNITED STATES PATENT OFFICE 2,149,298

LIQUID FEEDING SYSTEM FOR AIRPLANES AND THE LIKE

William Richard Kuzelka, New York, N. Y.

Application November 11, 1936, Serial No. 110,268

6 Claims. (Cl. 244—135)

This invention relates to liquid supply systems particularly adapted for use in the storage and delivery of liquids to the power units or motors of airplanes to insure proper and uniform delivery of the gasolene or of lubricating oils to the motors under normal and abnormal or emergency flight conditions thereby to materially contribute to the desired safety factor of airplane operation.

The novel features and improvements in construction and arrangement of my improved liquid feeding system are here illustrated in an embodiment adapted for the supplying or delivery of gasolene to the motor or motors of an airplane in a manner providing for a constant and uniform supply throughout all flight conditions or positions of the plane whether upright or inverted or such other positions as may be assumed in the range of airplane maneuvers.

The features and advantages of the present invention will be more fully understood by reference to the accompanying drawing wherein like reference characters are applied to the corresponding parts in the several views.

In the drawing:

Fig. 1 is a diagrammatic view partially in vertical cross-section showing the features of my invention incorporated in an airplane structure and adapted for the storage and feeding of the fuel oil or gasolene to the motors.

Fig. 2 is a detailed sectional view taken at right angles to the illustration of Fig. 1 showing the lower or supplemental fuel reservoir.

In the approved embodiment of the features of my invention as here illustrated it is designed for the storage and delivery of the fuel oil to the motors of an airplane. The assembly thereof is shown diagrammatically wherein I indicates a combined wing and liquid fuel oil tank of an airplane construction having the wing tank elevated with relation to the motor or power unit, the carburetor of which is indicated at c in the approximate relative position of the motor.

The wing tank 1, as will be understood, may be the conventional supporting wing and tank of the high wing type monoplane and is provided with the usual filling cap 2 having ball check valve 3 providing for air intake and operative to check outflow of the liquid fuel when flying in inverted position. From the wing tank the fuel passes through the supply line or pipe 4 to the motor or motors, the pipe 4 being connected to the lower portion of the tank and to the carburetor c as shown. The supply pipe is provided with a stop valve 5 and a check valve 6 having seat member 7 and co-operating ball valve 8 operative to prevent back flow of fuel to the wing tank under conditions of inverted flight. The check valve seat member as shown is formed as a threaded unit having external nut portion 9 and radially slotted sleeve portion 10 threaded to the valve casing 6, the slots thereof communicating with an annular chamber 11 of the casing with which the pipe 4 is connected to register. At 12 is positioned a perforate retainer disc for the check valve ball member. At 13 is an adjusting valve for the carburetor fuel intake.

In accordance with my invention, I associate with the described arrangement an auxiliary liquid fuel reservoir or tank 14 connected to the fuel supply line 4 and positioned normally below the motors as indicated. The auxiliary reservoir 14 is provided with a rigid cover plate 16 connected to the tubular flange extension of the valve casing 6 and with an opening communicating with the supply line 4 and this cover plate is formed with a domed or convex central portion as shown. To the cover plate there is secured at its marginal flange portion by bolts 17 a lower metal tank or protective member 18 and interposed between the plate and the protective member 18 is a flexible membrane 20 securely clamped at its marginal portions between the members 16 and 18. This flexible or supple membrane, formed of suitable material to be impervious and resistant to the fuel oil employed, forms in conjunction with the cover plate 16 the reservoir or container for an auxiliary fuel supply which is positioned to be effective for feeding of the fuel to the motor or carburetor during periods of inverted flight and at other positions of the plane when gravity influence tends to prevent proper feed of the fuel from the main or wing tank. The flexible membrane is desirably made of material having elastic properties such as synthetic rubber or treated fabric to impart pressure on the liquid by reason of the elasticity of the material. At the lower portion of the auxiliary tank member 14 there is provided an opening 22 into a funnel like air intake member 21 having its open side forwardly disposed with relation to the direction of travel and having its rearward wall 23 angularly arranged to determine the degree of pressure of the air intake upon the membrane. This wall 23 is formed with a vent 23' operative as a relief against excess pressure. The flared opening portion is provided with a screen or wire gauze 25 to prevent the entry of dust and likewise by its mesh determining the volume of the air intake. At 26 is indicated an emergency or extra fuel tank having pipe connection 27 to the wing tank and connection 28 to supply pipe 4 provided with a valve 29.

At 30 there is shown a bleeder opening in the cover plate 16 normally closed by a screw plug, the purpose of which is to allow for the escape of entrapped air in the initial filling of the auxiliary reservoir.

As will be understood from the construction as described, the improved fuel delivery system provides for favorable gravity influence or pressures for the delivery of the fuel to the carburetor in varied positions of the plane. Furthermore, the normal feeding pressure, resulting from the suction of the motors and normal external air pressures, is augmented by the intake of air through the opening 22 and associated intake funnel responsive to the speed of the plane. This air intake beneath the membrane 20 acts advantageously as a displacing medium without contact or possible admixture with the fuel liquid and the resulting pressure of fuel in the lower leg or portion of the fuel line operates as a deterrent to air intake of entrapped air in the upper leg of the feed pipe as a result of inverting or rolling action of the plane.

My improved liquid feeding system, as will be readily understood, may be employed with corresponding advantage for the delivery of oil to the lubricating system of motors of airplanes or the like in generally similar manner and arrangement as that described.

Having described my invention, I claim:

1. A gravity fuel feed system for airplanes and the like comprising the combination with a motor and a carburetor therefor; of a main tank from which the fuel will be supplied during a normal flight, supported at a higher elevation than said carburetor, a conduit connecting said main tank with said carburetor having a portion extending below the level of the latter, an auxiliary tank below the carburetor in normal flight for supplying the fuel during inverted flight connected to said portion having substantially unobstructed communication with said carburetor, and means in said conduit for automatically shutting off said main tank and said conduit leading to the same when the plane is in inverted position.

2. A gravity fuel feed system for airplanes and the like comprising the combination with a motor and a carburetor thereof; of a main tank from which the fuel will be supplied during a normal flight, supported at a higher elevation than said carburetor, a conduit connecting said main tank with said carburetor having a portion extending below the level of the latter, an auxiliary tank below the carburetor in normal flight for supplying the fuel during inverted flight connected to said portion having substantially unobstructed communication with said carburetor, and means in said conduit for automatically shutting off said main tank and said conduit leading to the same when the plane is in inverted position, and means in said auxiliary tank for increasing the normal feeding pressure.

3. A gravity fuel feed system for airplanes and the like comprising the combination with a motor and a carburetor therefor; of a main tank from which the fuel will be supplied during a normal flight, supported at a higher elevation than said carburetor, a conduit connecting said main tank with said carburetor having a portion extending below the level of the latter, an auxiliary tank below the carburetor in normal flight for supplying the fuel during inverted flight connected to said portion having substantially unobstructed communication with said carburetor, and means in said conduit for automatically shutting off said main tank and said conduit leading to the same when the plane is in inverted position, said auxiliary tank being provided with a reservoir forming membrane wall of flexible material and means for admitting air to said auxiliary tank beneath said membrane wall whereby the normal feeding pressure will be increased.

4. A gravity fuel feed system for airplanes and the like comprising the combination with a motor and a carburetor therefor; of a main tank from which the fuel will be supplied during a normal flight, supported at a higher elevation than said carburetor, a conduit connecting said main tank with said carburetor having a portion extending below the level of the latter, an auxiliary tank below the carburetor in normal flight for supplying the fuel during inverted flight connected to said portion having substantially unobstructed communication with said carburetor, a free floating and gravity actuated valve element in said conduit adjacent said auxiliary tank for shutting off said main tank and said conduit beyond said auxiliary tank when the plane is in inverted position.

5. A gravity fuel feed system for airplanes and the like comprising the combination with a motor and a carburetor therefor; of a main tank from which the fuel will be supplied during a normal flight, supported at a higher elevation than said carburetor, a conduit connecting said main tank with said carburetor having a portion extending below the level of the latter, an auxiliary tank below the carburetor in normal flight for supplying the fuel during inverted flight connected to said portion having substantially unobstructed communication with said carburetor, a free floating and gravity actuated valve for shutting off said main tank and said conduit beyond said auxiliary tank when the plane is in inverted position, said auxiliary tank being provided with a reservoir forming membrane wall of flexible material and means for admitting air to said auxiliary tank beneath said membrane wall whereby the normal feeding pressure will be increased.

6. A gravity fuel feed system for airplanes and the like comprising the combination with a motor and a carburetor therefor; of a main tank from which the fuel will be supplied during a normal flight, supported at a higher elevation than said carburetor, a conduit connecting said main tank with said carburetor having a portion extending below the level of the latter, an auxiliary tank below the carburetor in normal flight for supplying the fuel during inverted flight connected to said portion having substantially unobstructed communication with said carburetor, and means in said conduit for automatically shutting off said main tank and said conduit leading to the same when the plane is in inverted position, said auxiliary tank having a domed cover plate, a lower tank member and a membranous wall member of flexible material forming, together with said cover plate, a fuel reservoir and a funnel-shaped intake port to said auxiliary tank directed forwardly with respect to the direction of the travel of the plane whereby air will be admitted beneath said membranous wall to increase the normal feeding pressure.

WILLIAM RICHARD KUZELKA.